United States Patent
Huang

(10) Patent No.: US 7,059,021 B1
(45) Date of Patent: Jun. 13, 2006

(54) LOPPER SHEAR WITH AN IMPROVED STRUCTURE

(75) Inventor: Yao-Chung Huang, Chang Hua Hsien (TW)

(73) Assignee: Ho Cheng Garden Tools Co., Ltd., Fu Shing Hsiang (TW)

( * ) Notice: Subject to any disclaimer, the term of this patent is extended or adjusted under 35 U.S.C. 154(b) by 0 days.

(21) Appl. No.: 10/785,039

(22) Filed: Feb. 25, 2004

(51) Int. Cl.
*B25G 1/04* (2006.01)
*A47H 11/04* (2006.01)

(52) U.S. Cl. .................... 16/428; 16/442; 24/136 R

(58) Field of Classification Search .............. 16/428, 16/442, 441; 24/136 R, 136 A; 160/178.1, 160/178.2, 168.1 R, 168.1 V; 294/19.1, 294/24, 104; 30/231–232, 249–250, 296.1, 30/298; 403/121–122, 76; 482/125–126, 482/121; 123/185.2, 185.3, 185.4
See application file for complete search history.

(56) References Cited

U.S. PATENT DOCUMENTS

| 2,241,679 | A | * | 5/1941 | Taylor ........................ 74/502 |
| 2,494,759 | A | * | 1/1950 | Hirschy ..................... 24/136 A |
| 3,360,858 | A | * | 1/1968 | Cowley ........................ 30/249 |
| 3,572,307 | A | * | 3/1971 | Harkness et al. ......... 123/185.2 |
| 4,327,797 | A | * | 5/1982 | Nakajima et al. ..... 160/168.1 R |
| 4,442,603 | A | * | 4/1984 | Wallace et al. ............... 30/249 |
| 4,546,851 | A | * | 10/1985 | Brennan ........................ 182/7 |
| 5,237,722 | A | * | 8/1993 | Ott .............................. 16/428 |
| 5,778,539 | A | * | 7/1998 | Schneider et al. ............ 30/231 |

FOREIGN PATENT DOCUMENTS

DE        3405163 A1 * 11/1984

* cited by examiner

*Primary Examiner*—Chuck Y. Mah
(74) *Attorney, Agent, or Firm*—Alan D. Kamrath; Nikolai & Mersereau, P.A.

(57) ABSTRACT

A lopper shear pull-rope grip includes a closed end provided with a bulge. The through hole of the bulge is connected to the hollow notch of the grip, where a rope can penetrate the through hole. And, a slanting board extends downwards from the through hole. The slanting board is provided with a conductive rim. Moreover, a through notch is formed in the grip under the bulge. A pulley is mounted in the through notch and has a rim. Thus, the pulley can slide smoothly along the slanting board of the grip. When the rope is pulled upwards, the pulley will clamp the rope more compactly so as to adjust and position the rope rapidly for convenient and loose-free usage.

9 Claims, 7 Drawing Sheets

LOPPER SHEAR WITH AN IMPROVED STRUCTURE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a lopper shear pull-rope grip, and more particularly to a lopper shear pull-rope grip which is designed with adjustable rope length and positioning for convenient and loose-free usage.

BACKGROUND OF THE INVENTION

The lopping shear is generally applied to control the shear of cutting tools via the pull-rope grip. For this purpose, a grip 50 shall be provided at one end of the rope 60 for the end-user (as shown in FIG. 5). To match the practical height of different end-users and meet the labor-saving requirement, the grip 50 60 shall be designed with an adjustable length of rope 60 and positioning for convenient usage. The typical structure is as follows: a bulge 51 (as shown in FIGS. 6 and 7) shall be provided at the upper end of an arc grip 50. And, the bulge 51 is mounted with an open hole 52, which is connected to a hollow notch 53 within the grip 50 for the threading of a rope 60. Besides, the turning site shall be provided with a notch 54, which has a smaller external diameter than the rope 60. A fixation point 55 is placed at both sides of the hollow notch 53 for the threading of rope 60. Furthermore, an awl 56 is arranged at one lateral wall of the fixation point 55. Thereupon, adjusting of rope length and positioning of lopping shear is possible. However, the following issues shall be addressed in applications:

When the grip 50 is used to position the rope 60, the rope 60 shall be located at the notch 54 and fixation point 55 (as shown in FIG. 8), wherein an awl 56 will punch through and fix the rope 60. In the case of smaller pulling force, friction does occur at the turning site of the rope 60, open hole 52 and hollow notch 53. So, it is possible to break off the rope 60 after a long-time application. In the case of bigger pulling forces, the positioning mode will possibly lead to inconvenience arising from loose rope.

Therefore, based upon the aforementioned disadvantages of a lopping shear pull-rope grip, this industry shall assume the responsibility to make pioneering R& D and innovation for a utility model.

BRIEF SUMMARY OF THE INVENTION

The present invention can offer an improved efficiency as detailed below:

A slanting board 16 extends downwards from a turning site of the through hole 14 of the grip bulge 13 connecting to the hollow notch 15. The slanting board 16 is provided with a conductive rim 17. Moreover, through notches 18 are mounted at the front and back of the projecting grip 10 under the bulge 13. With a blocking rim 19, the through notch 18 is provided with a blocking ring 32 over the blocking rim 19. And, the screws 40 can punch through the blocking ring 32 and pulley 30 for positioning. Thus, the pulley 30 can slide smoothly along the slanting board 16 of the grip 10, where the rope 20 shall be clamped into another turning site of the through hole 14 connecting to hollow notch 15. When the end-user tries to hold the grip 10 and pull down the rope 20, the rope 20 over the grip 10 will be pulled upwards, making the pulley 30 clamp rope 20 more compactly as shown in FIG. 4. If an end-user wants to loosen the pulley 30, just pull the rope 20 punching through the grip 10 and let the pulley 30 glide, then the rope 20 will be loosened. In such case, it is possible to adjust the rope length for both positioning and for convenient and loose-free usage against bigger force.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 1:
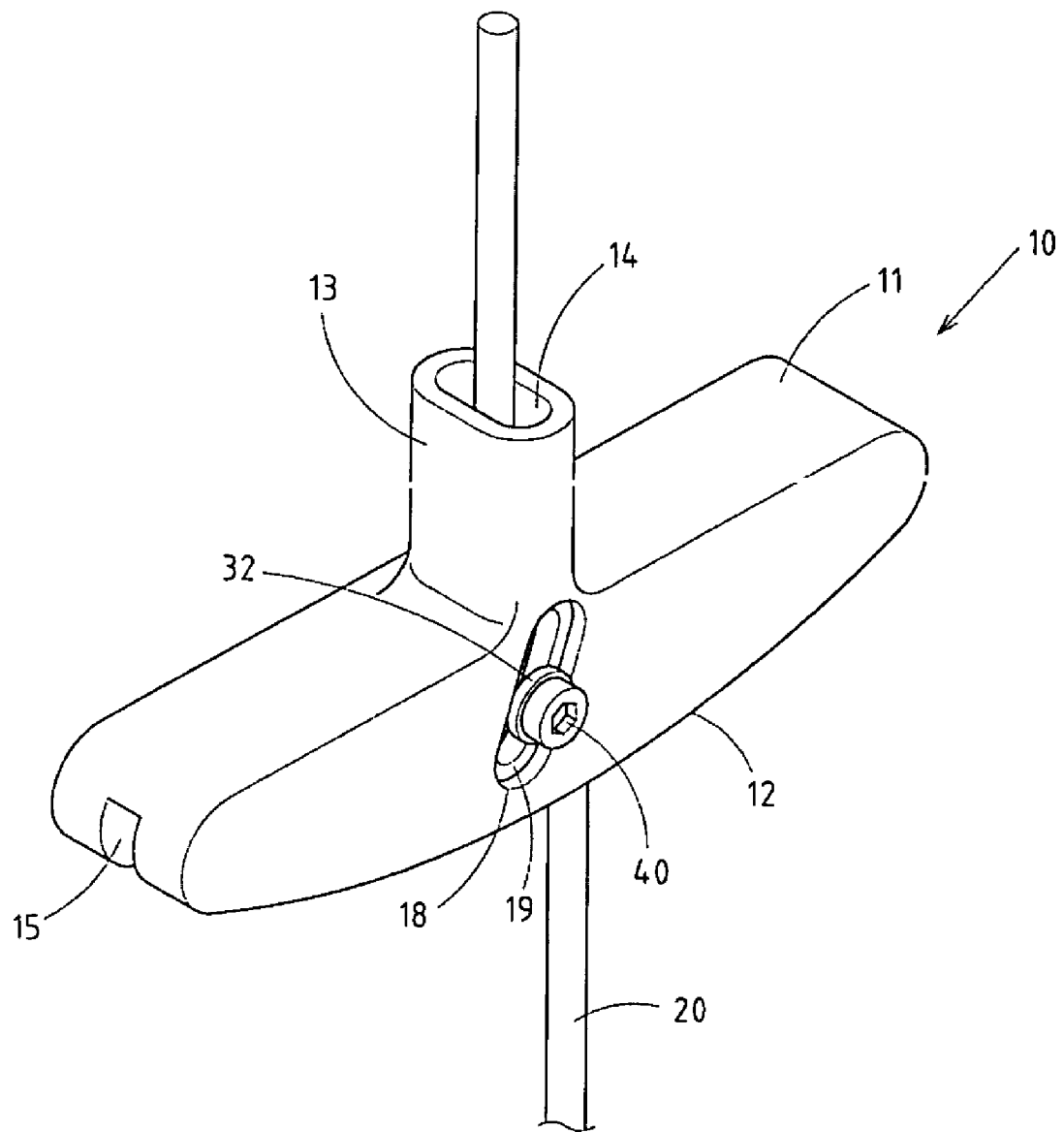
FIG. 1 shows a perspective view of the present invention.
Figure 2:
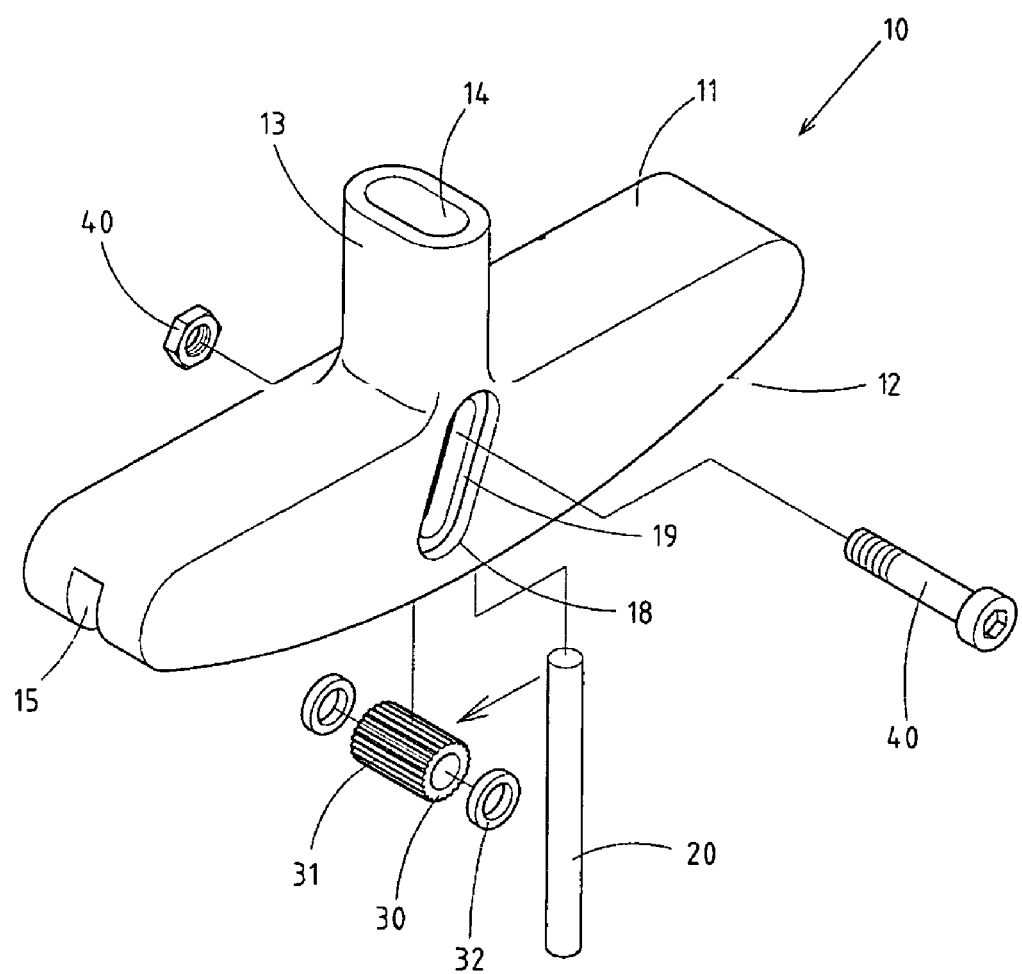
FIG. 2 shows an exploded perspective view of the present invention.
Figure 3:
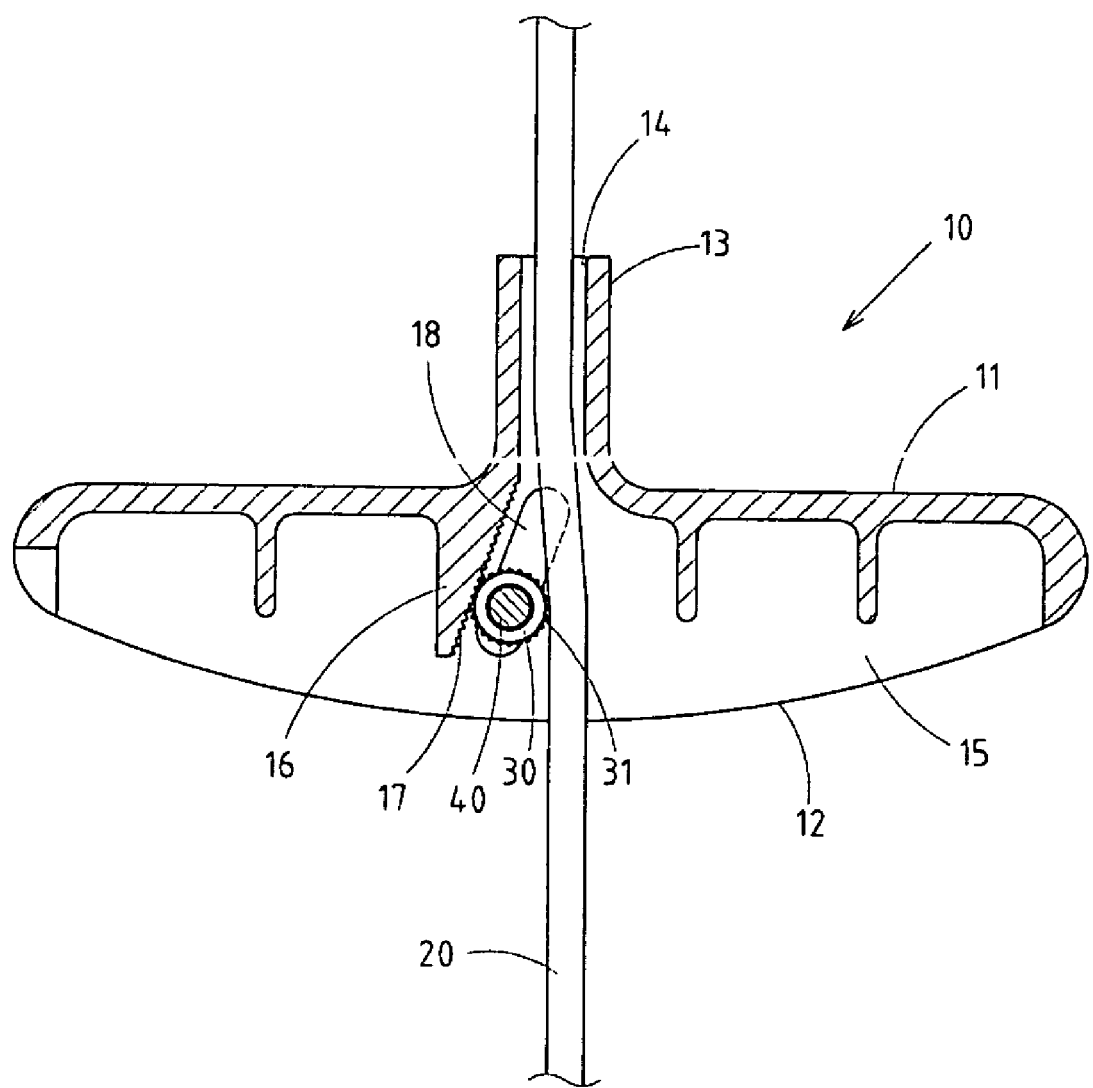
FIG. 3 shows a cross-sectional view of the present invention.

As shown in FIGS. 1–3, there is a lopper shear pull-rope grip embodied in the present invention:

The present invention has a grip 10, available with a closed end 11 at its top and an open end 12 at its bottom. The closed end 11 is provided with a bulge 13, which has a through hole 14 at the inner side of the grip 10. The through hole 14 is connected to the hollow notch 15 formed by the open end 12, where a rope 20 can punch through hole. And, a slanting board 16 extends downwards from a turning site of the through hole 14 connecting to the hollow notch 15. The slanting board 16 is provided with a conductive rim 17. Moreover, through notches 18 are mounted at the front and back of the projecting grip 10 under the bulge 13. With an oblong oval, the through notch 18 is obliquely installed together with the slanting board 16. Additionally, the through notch 18 has a blocking rim 19.

The present invention also includes a pulley 30, which has a hollow structure. A rim 31 shall be provided externally to match the conductive rim 17 over the slanting board 16 of grip 10, thereby installing it between the through notches 18 at front and back of grip 10. And, a blocking ring 32 shall be provided over the inner blocking rim 19 of the through notch 18, where the screws 40 can punch through the blocking ring 32 and pulley 30 for positioning. Thus, the pulley 30 can slide smoothly along the slanting board 16 of the grip 10.

Figure 4:
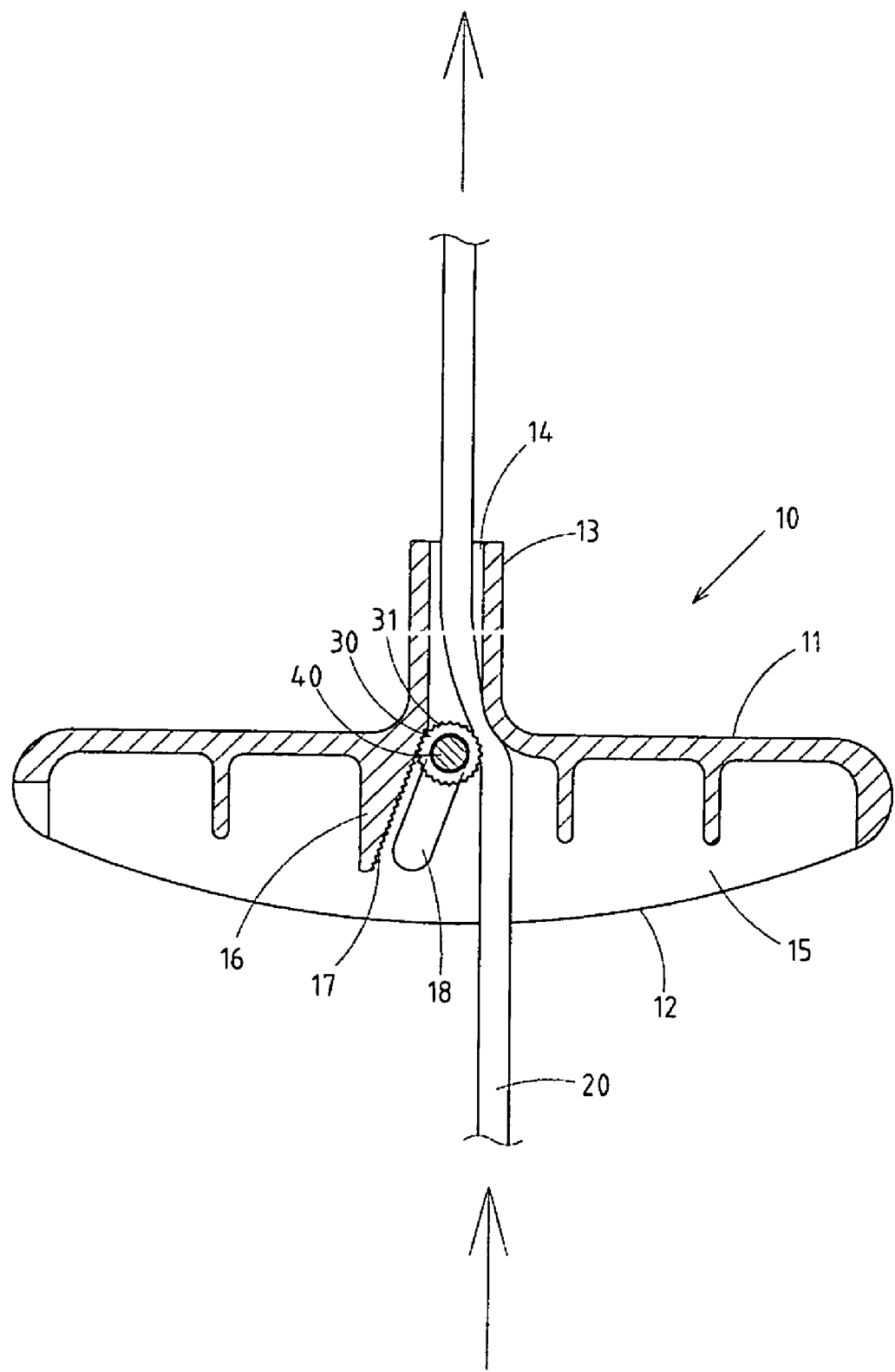
FIG. 4 shows a schematic plan of the shear action.
Figure 5:
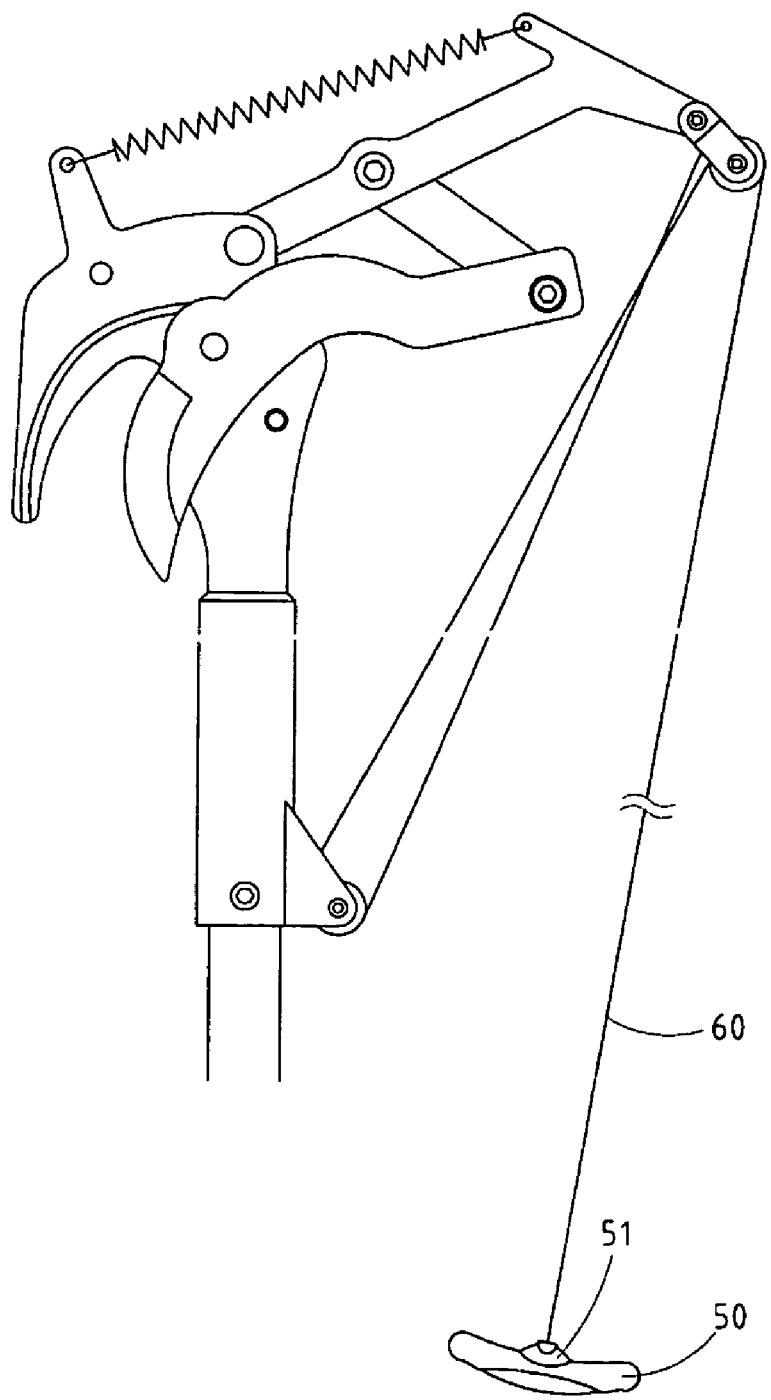
FIG. 5 shows an external side elevation view of the typical structure.
Figure 6:
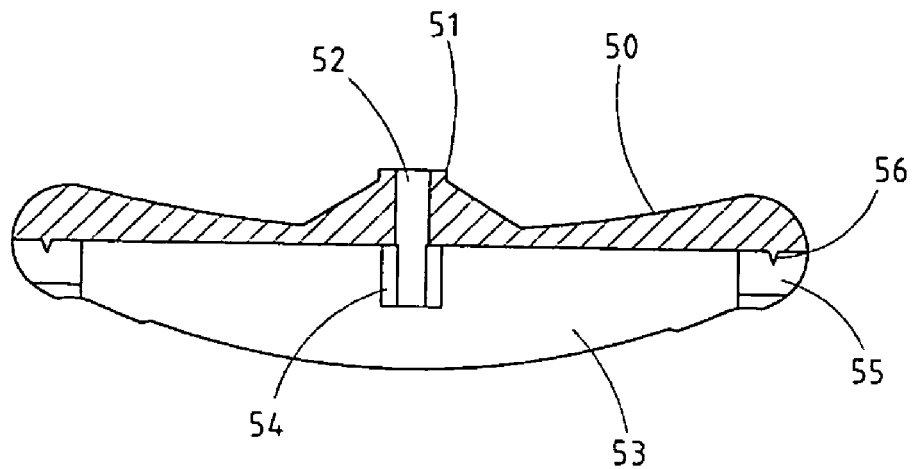
FIG. 6 shows a cross-sectional view of the typical grip.
Figure 7:
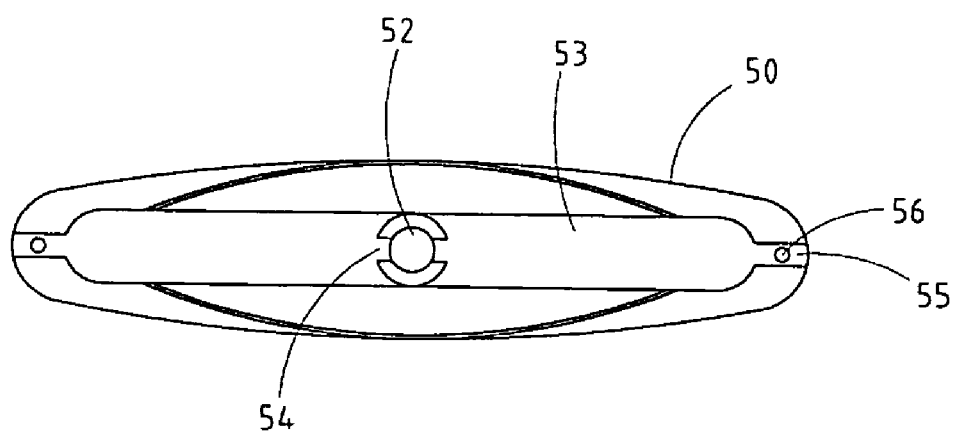
FIG. 7 shows a bottom view of the typical grip.
Figure 8:
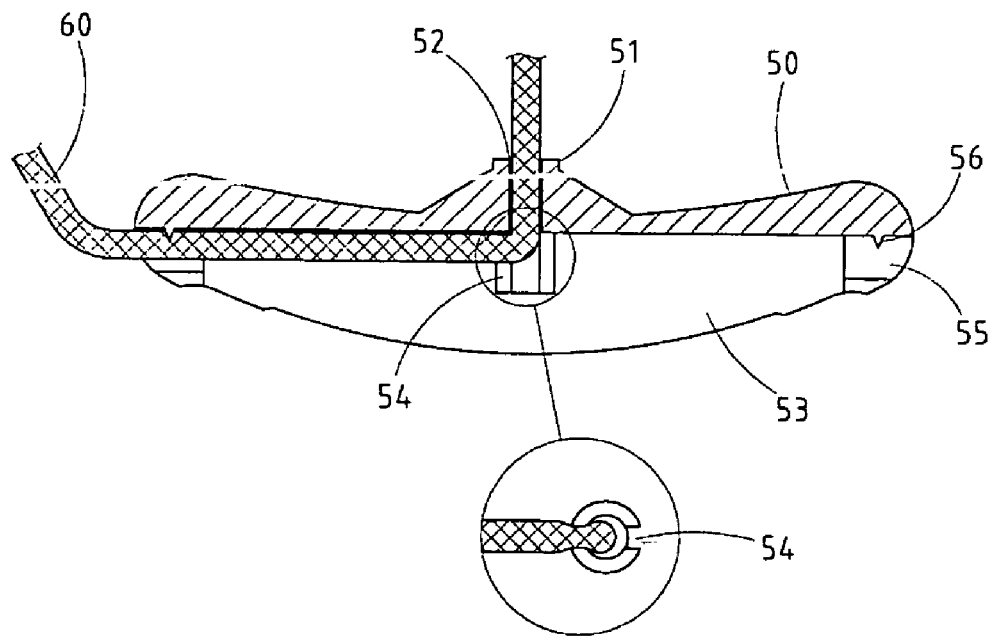
FIG. 8 shows a sectional view of a schematic plan of positioning of rope by the typical grip.

Based upon the structures as above specified, the pulley 30 can be pushed over the slanting board 16, where the rope 20 shall be clamped into another turning site of the through hole 14 connecting to hollow notch 15. When the end-user tries to hold the grip 10 and pull down the rope, the rope 20 over the grip 10 will be pulled upwards, making the pulley 30 clamp rope 20 more compactly (as shown in FIG. 4). If the end-user wants to loosen the pulley 30, just pull the rope 20 punching through the grip 10 and let the pulley 30 glide, then the rope 20 will be loosened. In such case, it is possible to adjust the rope length for both positioning and for convenient and loose-free usage against bigger force.

I claim:

1. A lopper shear pull-rope grip comprising:
   a grip having a closed first end provided with a bulge protruding outward therefrom and an open second end formed with a hollow notch, the bulge of the grip having an inside formed with a through hole extended into an inside of the grip and connected to the hollow notch, the grip has two sides each formed with a through notch located under and inclined relative to the bulge;
   a slanting board extending downwards from a bottom of the bulge and provided with a toothed conductive rim located under the through hole of the bulge and parallel with the through notch;
   a rope extended through the hollow notch, the inside of the grip and the through hole of the bulge;
   a pulley slidably mounted in the through notch of the grip and having a toothed rim engageable with the conductive rim of the slanting board and movable in the through notch to press the rope;
   a screw member extended through the pulley and slidably mounted in the through notch of the grip.

2. The lopper shear pull-rope grip defined in claim 1, wherein each through notch of the grip has two sides each provided with a blocking rim, and the lopper shear pull-rope grip further comprises two blocking rings each rested on the respective blocking rim of the through notch and each located between the pulley and the screw member.

3. The lopper shear pull-rope grip defined in claim 1, wherein the bulge is perpendicular to the closed first end of the grip, so that the bulge and the closed first end of the grip form a substantially inverted T-shaped structure.

4. The lopper shear pull-rope grip defined in claim 1, wherein the hollow notch is longitudinally extended through a whole length of the open second end of the grip.

5. The lopper shear pull-rope grip defined in claim 1, wherein each through notch of the grip has a substantially oblong shape.

6. The lopper shear pull-rope grip defined in claim 1, wherein each through notch is transversely extended through a whole width of the grip and connected to the inside of the grip.

7. The lopper shear pull-rope grip defined in claim 1, wherein the pulley has a substantially cylindrical shape.

8. The lopper shear pull-rope grip defined in claim 1, wherein the two blocking rings are located at two ends of the pulley, and the screw member is extended through each of the two blocking rings.

9. The lopper shear pull-rope grip defined in claim 1, wherein the blocking rim of the through notch has a substantially oblong shape.

* * * * *